(12) United States Patent
Shinn et al.

(10) Patent No.: US 8,000,091 B2
(45) Date of Patent: Aug. 16, 2011

(54) ELECTROPHORETIC DISPLAY APPARATUS

(75) Inventors: Ted-Hong Shinn, Hsinchu (TW);
Yu-Sheng Lin, Hsinchu (TW);
Hung-Pin Su, Hsinchu (TW); Yi-Ching Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 793 days.

(21) Appl. No.: 12/102,174

(22) Filed: Apr. 14, 2008

(65) Prior Publication Data
US 2009/0153465 A1  Jun. 18, 2009

(30) Foreign Application Priority Data
Dec. 18, 2007  (TW) ................................ 96148495 A

(51) Int. Cl.
*G06F 1/16* (2006.01)
(52) U.S. Cl. ...................... 361/679.1; 257/679; 345/174; 438/592; 349/158
(58) Field of Classification Search ............... 257/40, 257/43, 88, 679, 347, 678; 345/204, 206, 345/174, 98, 82, 8; 438/38, 29, 244, 640, 438/149, 592; 349/152, 138, 189, 150, 158; 361/789, 795, 818, 679.09, 679.28, 697, 361/679.39
See application file for complete search history.

(56) References Cited

U.S. PATENT DOCUMENTS

| | | | | |
|---|---|---|---|---|
| 7,852,625 B2 * | 12/2010 | Asawa et al. | ............ | 361/679.55 |
| 2009/0040712 A1 * | 2/2009 | Hoshi et al. | ................... | 361/685 |
| 2010/0117078 A1 * | 5/2010 | Kuwabara et al. | .............. | 257/43 |
| 2010/0245306 A1 * | 9/2010 | Koyama et al. | ............... | 345/205 |

FOREIGN PATENT DOCUMENTS

| | | |
|---|---|---|
| CN | 1687824 | 10/2005 |
| CN | 1963653 | 5/2007 |

OTHER PUBLICATIONS

English language translation of abstract of CN1963653 (published May 16, 2007).
English language translation of abstract of CN 1687824 (published Oct. 26, 2005).

* cited by examiner

*Primary Examiner* — Hung Duong
(74) *Attorney, Agent, or Firm* — Thomas, Kayden, Horstemeyer & Risley, LLP

(57) ABSTRACT

An electrophoretic display apparatus includes a display module and a case. The display module includes a flexible array substrate, a front plane laminate, a driving circuit and a flexible printed circuit board. The flexible array substrate has a display area and a peripheral circuit area adjacent to the display area. The front plane laminate is disposed on the display area. The driving circuit is electrically connected to the flexible array substrate. The flexible printed circuit board is electrically connected to the driving circuit. The case contains the display module and has an opening exposing at least a part of the front plane laminate.

19 Claims, 4 Drawing Sheets

ELECTROPHORETIC DISPLAY APPARATUS

RELATED APPLICATIONS

This application claims priority to Taiwan Application Serial Number 96148495, filed Dec. 18, 2007, which is herein incorporated by reference.

BACKGROUND

1. Field of Invention

The present invention relates to a display apparatus. More particularly, the present invention relates to an electrophoretic display apparatus.

2. Description of Related Art

The electrophoretic display apparatus of the first generation was developed in 1970. The first generation electrophoretic display apparatus has many charged little balls. One side of the balls is white, and the other side thereof is black. When the applied electric field is changed, the balls will rotate to show white or black color. The electrophoretic display apparatus of the second generation was developed in 1990. The second generation electrophoretic display apparatus uses microcapsules to replace the charged balls. The capsules filled with colored oil and white-colored particles inside. An external electrical field is applied to the white-colored particles to control their motions. When the white-colored particles move upward (in the direction toward the reader), the electrophoretic display apparatus will show white color. When the white-colored particles move downward (in the direction away from the reader), the electrophoretic display apparatus will show the color of the oil.

Generally, the electrophoretic display apparatus has a glass array substrate therein. However, the electrophoretic display apparatus having the glass array substrate is too hard and thick to satisfy commercial requirements. Therefore, how to replace the glass array substrate has been an issue for the pertinent field.

SUMMARY

According to one embodiment of the present invention, an electrophoretic display apparatus includes a display module and a case. The display module includes a flexible array substrate, a front plane laminate, a driving circuit and a flexible printed circuit board. The flexible array substrate has a display area and a peripheral circuit area adjacent to the display area. The front plane laminate is disposed on the display area. The driving circuit is electrically connected to the flexible array substrate. The flexible printed circuit board is electrically connected to the driving circuit. The case contains the display module and has an opening exposing at least a part of the front plane laminate.

According to another embodiment of the present invention, an electrophoretic display apparatus includes a display module, a bottom shell and a top frame. The display module includes a flexible array substrate, a front plane laminate, a driving circuit and a flexible printed circuit board. The flexible array substrate has a display area and a peripheral circuit area adjacent to the display area. The front plane laminate is disposed on the display area. The driving circuit is electrically connected to the flexible array substrate. The flexible printed circuit board is electrically connected to the driving circuit. The bottom shell covers a surface of the flexible array substrate which faces away from the front plane laminate. The top frame covers the peripheral circuit area of the flexible array substrate and is fastened to the bottom shell.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

An electrophoretic display apparatus whose glass array substrate is replaced with a flexible array substrate may have bad reliability at high temperatures or humidity because the flexible array substrate can not resist high temperatures or humidity. Furthermore, an unskilled user may over bend the flexible array substrate to break the transparent electrode thereof because the flexible array substrate can be bended easily. Accordingly, the following embodiment of the present invention provides an electrophoretic display apparatus, which has a case to protect the flexible array substrate.

Figure 1:
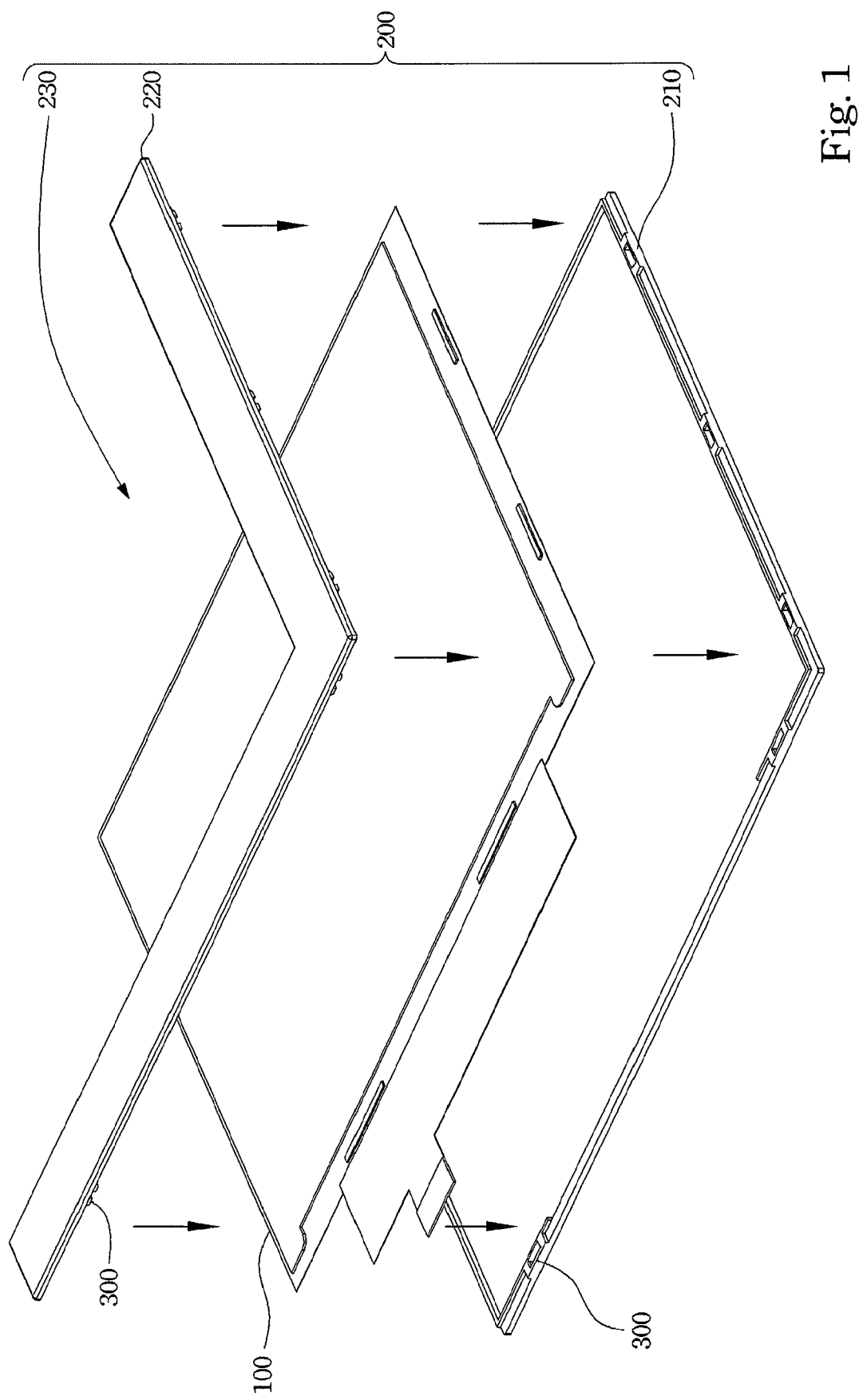
FIG. 1 is an exploded view of an electrophoretic display apparatus according to one embodiment of the present invention.
Figure 2:
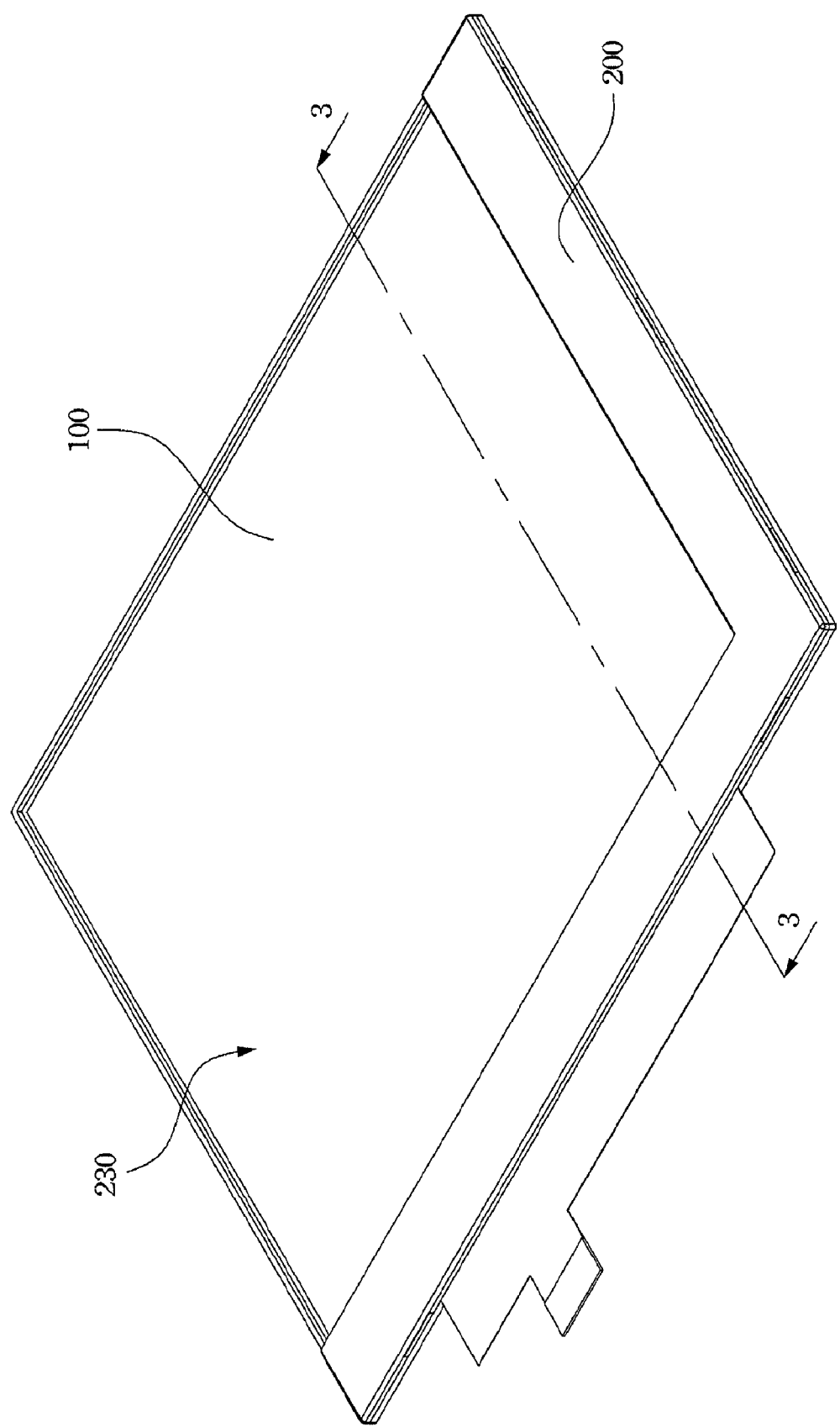
FIG. 2 is a three dimensional view of the electrophoretic display apparatus of FIG. 1.

FIG. 1 is an exploded view of an electrophoretic display apparatus according to one embodiment of the present invention. FIG. 2 is a three dimensional view of the electrophoretic display apparatus of FIG. 1. The electrophoretic display apparatus may include a display module 100, a bottom shell 210 and a top frame 220. The top frame 220 is fastened to the bottom shell 210 as a case 200 by at least one fastener 300. The case 200 contains the display module 100 to provide structural reinforcement and prevent undesirable moisture and high temperatures from affecting the display module 100.

Figure 3:
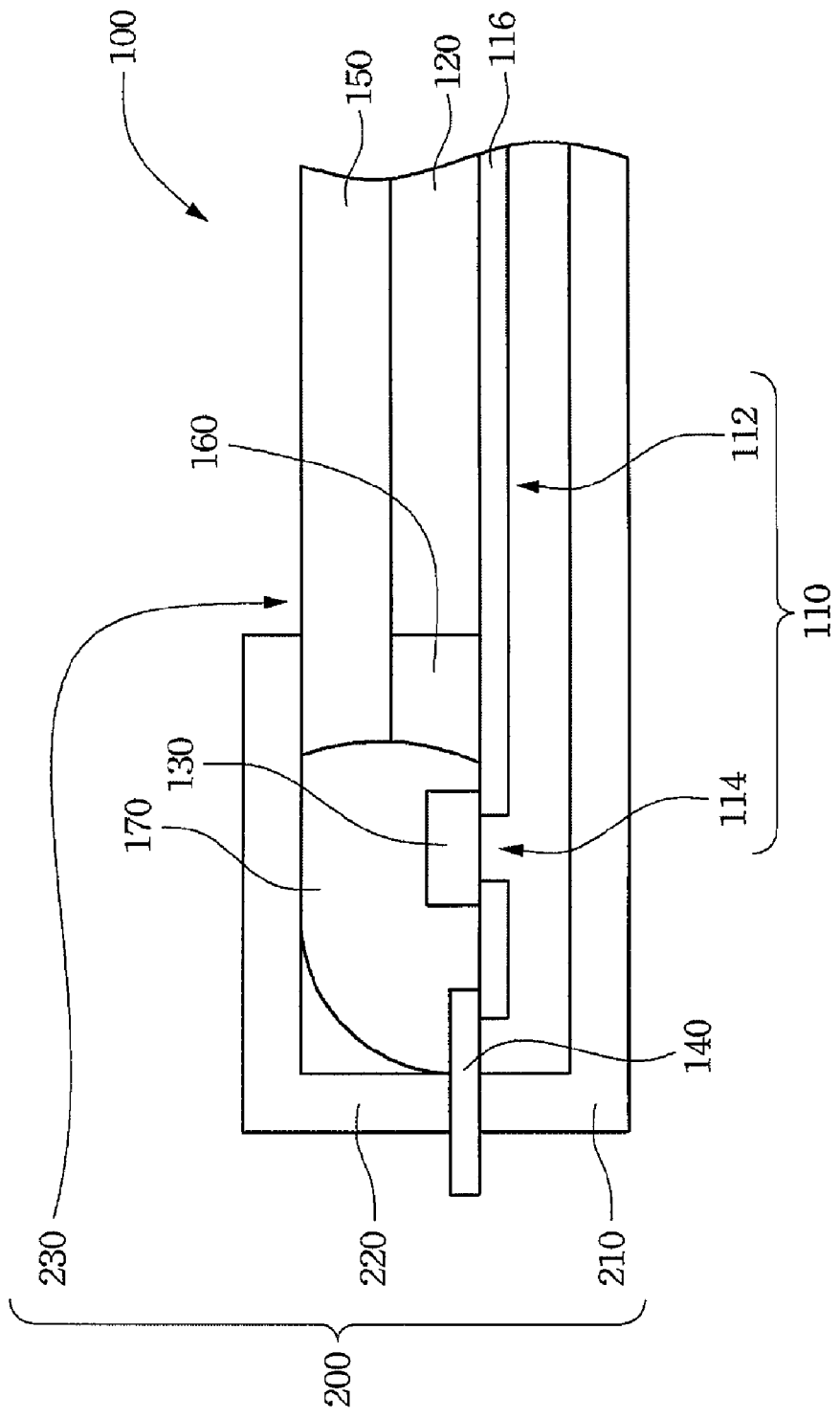
FIG. 3 is a sectional view taken along the line 3-3 of FIG. 2.

FIG. 3 is a sectional view taken along the line 3-3 of FIG. 2. The display module 100 includes a flexible array substrate 110, a front plane laminate (FPL) 120, a driving circuit 130 and a flexible printed circuit board 140. The flexible array substrate 110 has a display area 112 and a peripheral circuit area 114 adjacent to the display area 112. The FPL 120 is disposed on the display area 112. The driving circuit 130 is electrically connected to the flexible array substrate 110. The flexible printed circuit board 140 is electrically connected to the driving circuit 130.

The top frame 220 covers the peripheral circuit area 114 of the flexible array substrate 110. The bottom shell 210 covers a surface of the flexible array substrate 110 which faces away from the FPL 120. Moreover, although the case 200 contains the display module 100, the case 200 still has an opening 230 exposing at least a part of the FPL 120. Accordingly, the case 200 can protect the transparent electrode of the flexible array substrate 110 from over-bending, but a user can still watch the displayed images through the opening 230.

In the present embodiment, the case 200 (including the bottom shell 210 and the top frame 220) may be made of plastic such as polycarbonate (PC) or acrylonitrile-butadiene-styrene (ABS).

As shown in FIG. 1, the fastener 300 may be a hook set. It is easily understood that the hook set as the fastener 300 is only one of the examples. The fastener 300 can also be another proper fastener. People skilled in the art can select a proper fastener if necessary.

In the present embodiment, the term "flexible array substrate" is interpreted as "an array substrate is substantially made of a flexible material." For example, the flexible array substrate 110 of FIG. 3 may be made of polyimide (PI), polyethylene terephthalate (PET), polyethersulfone (PES), cellulose triacetate (TAC) or a photosensitive polymer. It is easily understood that the mentioned materials are only some of the examples. The flexible array substrate 110 may also be made of another proper flexible material.

Moreover, the driving circuit 130 of FIG. 3 is electrically connected to the flexible array substrate 110 and the flexible printed circuit board 140 by the circuit 116 of the flexible array substrate 110. Although FIG. 1 shows the driving circuit 130 is mounted onto the flexible array substrate 110 by the chip on glass (COG) technology, another proper technology, such as the chip on film (COF) technology or the tape automated bonding (TAB) technology, may also be performed to package the driving circuit 130.

In order to strengthen the protection for the FPL 120 and the driving circuit 130, the display module 100 of FIG. 3 may include a protection layer 150, an edge protection 160 and a peripheral protection 170. The protection layer 150 covers a surface of the FPL 120 which faces away from the flexible array substrate 110. The edge protection 160 surrounds the FPL 120. The peripheral protection 170 covers the driving circuit 130.

Figure 4:
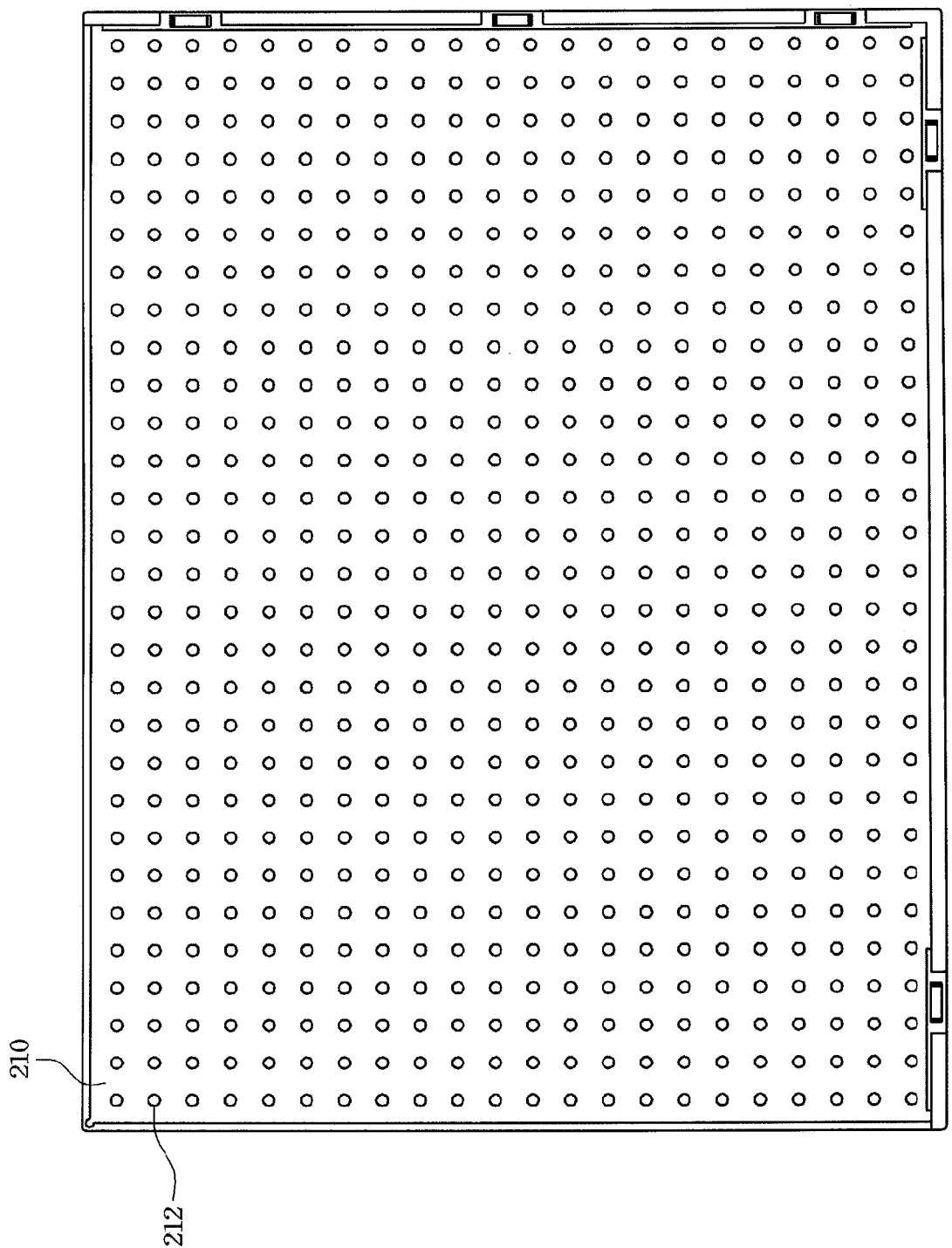
FIG. 4 is a top view of a bottom shell according to another embodiment of the present invention.

FIG. 4 is a top view of a bottom shell according to another embodiment of the present invention. Although the bottom shell 210 of FIG. 1 is holeless, this does not limit the scope of the present invention. The bottom shell 210 of FIG. 4 may have a plurality of holes 212 arranged thereon to discharge the moisture from the inside of the case.

A switching test, a storage test and a thermal cycle test were run to determine the reliability of the electrophoretic display apparatuses of FIGS. 1-4 at high temperatures or humidity. In the following working examples 1~4, the structural connections and materials described before are not repeated hereinafter, and only further information is supplied to actually perform the electrophoretic display apparatuses.

The electrophoretic display apparatuses of the working examples 1~4 had the following common characteristics:

(1) The thickness of the bottom shell and the thickness of the top frame were both 0.2 mm.

(2) The length and the width of the bottom shell were 145.5±0.15 mm and 112±0.15 mm respectively.

(3) The length and the width of the top frame were 145.5±0.15 mm and 112±0.15 mm respectively.

(4) The flexible array substrate was made of polyimide (PI).

(5) The thickness of the flexible array substrate was 0.01 mm.

The electrophoretic display apparatus of the working example 1 was the same as that of FIGS. 1-3, and the case was made of PC. The electrophoretic display apparatus of the working example 2 was substantially the same as that of the working example 1 except that its case was made of ABS. The electrophoretic display apparatus of the working example 3 was substantially the same as that of the working example 1 except that its bottom shell had a plurality of holes arranged thereon (as shown in FIG. 4). The diameter of each hole was 1.5 mm, and the holes were spaced 4.9 mm apart. The electrophoretic display apparatus of the working example 4 was substantially the same as that of the working example 3 except that its case was made of ABS.

The test results were determined as indicated in the following table I.

TABLE I

| | Working Example | | | |
|---|---|---|---|---|
| | 1 | 2 | 3 | 4 |
| Switching Test[1] | Pass | Pass | Pass | Pass |
| Storage Test[2] | Pass | Pass | Pass | Pass |
| Thermal Cycle Test[3] | Pass | Pass | Pass | Pass |

Note:
[1]Switching Test: the electrophoretic display apparatuses were turned on and off continuously for 240 hours at a temperature of 40° C. and 90% relative humidity.
[2]Storage Test: the electrophoretic display apparatuses were stored at a temperature of 60° C. and 80% relative humidity for 240 hours.
[3]Thermal Cycle Test: the electrophoretic display apparatuses were thermally cycled from −25° C. to 70° C. for 100 times, wherein the heating rate of the thermal cycle test was 3° C./min, the cooling rate of the thermal cycle test was 1° C./min, and the heating/cooling operation would be stopped for 30 minutes when the electrophoretic display apparatuses were at a temperature of −25° C. or 70° C.

According to the table I, all the electrophoretic display apparatuses of the working examples 1~4 could operate properly after the switching test, the storage test and the thermal cycle test, that is, pass the switching test, the storage test and the thermal cycle test.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electrophoretic display apparatus comprising:
a display module comprising:
a flexible array substrate comprising:
a display area; and
a peripheral circuit area adjacent to the display area;
a front plane laminate disposed on the display area;
a driving circuit electrically connected to the flexible array substrate; and
a flexible printed circuit board electrically connected to the driving circuit; and
a case containing the display module and having an opening exposing at least a part of the front plane laminate.

2. The electrophoretic display apparatus of claim 1, wherein the case comprises:
a bottom shell covering a surface of the flexible array substrate which faces away from the front plane laminate;
a top frame covering the peripheral circuit area of the flexible array substrate; and
at least one fastener fastening the top frame to the bottom shell.

3. The electrophoretic display apparatus of claim 2, wherein the bottom shell has a plurality of holes arranged thereon.

4. The electrophoretic display apparatus of claim 1, wherein the case is made of plastic.

5. The electrophoretic display apparatus of claim 1, wherein the case is made of polycarbonate or acrylonitrile-butadene-styrene.

6. The electrophoretic display apparatus of claim 1, wherein the display module comprises a protection layer covering a surface of the front plane laminate which faces away from the flexible array substrate.

7. The electrophoretic display apparatus of claim 1, wherein the display module comprises an edge protection surrounding the front plane laminate.

8. The electrophoretic display apparatus of claim 1, wherein the display module comprises a peripheral protection covering the driving circuit.

9. The electrophoretic display apparatus of claim 1, wherein the flexible array substrate is made of polyimide, polyethylene terephthalate, polyethersulfone, cellulose triacetate or a photosensitive polymer.

10. An electrophoretic display apparatus comprising:
   a display module comprising:
      a flexible array substrate comprising:
         a display area; and
         a peripheral circuit area adjacent to the display area;
      a front plane laminate disposed on the display area;
      a driving circuit electrically connected to the flexible array substrate; and
      a flexible printed circuit board electrically connected to the driving circuit;
   a bottom shell covering a surface of the flexible array substrate which faces away from the front plane laminate; and
   a top frame covering the peripheral circuit area of the flexible array substrate and fastened to the bottom shell.

11. The electrophoretic display apparatus of claim 10, wherein the bottom shell has a plurality of holes arranged thereon.

12. The electrophoretic display apparatus of claim 10, wherein the bottom shell is made of plastic.

13. The electrophoretic display apparatus of claim 10, wherein the bottom shell is made of polycarbonate or acrylonitrile-butadene-styrene.

14. The electrophoretic display apparatus of claim 10, wherein the top frame is made of plastic.

15. The electrophoretic display apparatus of claim 10, wherein the top frame is made of polycarbonate or acrylonitrile-butadene-styrene.

16. The electrophoretic display apparatus of claim 10, wherein the display module comprises a protection layer covering a surface of the front plane laminate which faces away from the flexible array substrate.

17. The electrophoretic display apparatus of claim 10, wherein the display module comprises an edge protection surrounding the front plane laminate.

18. The electrophoretic display apparatus of claim 10, wherein the display module comprises a peripheral protection covering the driving circuit.

19. The electrophoretic display apparatus of claim 10, wherein the flexible array substrate is made of polyimide, polyethylene terephthalate, polyethersulfone, cellulose triacetate or a photosensitive polymer.

* * * * *